No. 876,100. PATENTED JAN. 7, 1908.
B. SCHNEIDER.
ODOMETER FOR USE IN CONNECTION WITH FARE INDICATORS.
APPLICATION FILED OCT. 3, 1906.

7 SHEETS—SHEET 1.

Witnesses:

Inventor
Berthold Schneider
By
James L. Norris
Atty.

No. 876,100. PATENTED JAN. 7, 1908.
B. SCHNEIDER.
ODOMETER FOR USE IN CONNECTION WITH FARE INDICATORS.
APPLICATION FILED OCT. 3, 1906.
7 SHEETS—SHEET 4.
Fig. 4.
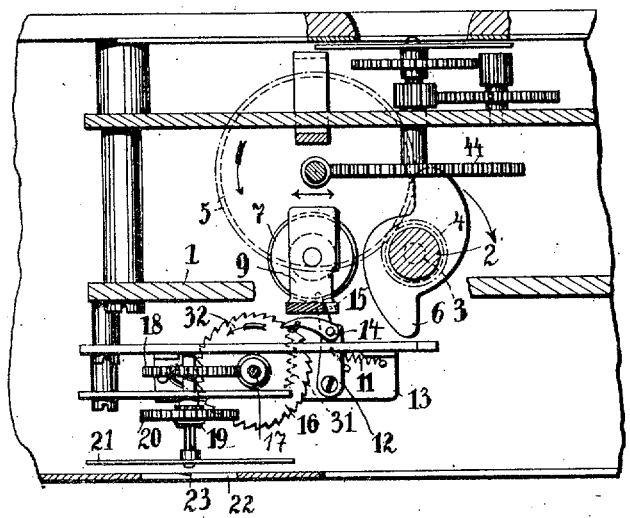
Fig. 5.
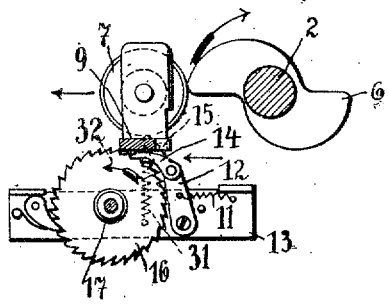
Witnesses
Inventor
Berthold Schneider
By
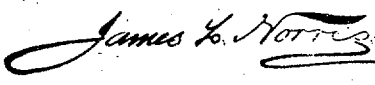
Atty.

No. 876,100. PATENTED JAN. 7, 1908.
B. SCHNEIDER.
ODOMETER FOR USE IN CONNECTION WITH FARE INDICATORS.
APPLICATION FILED OCT. 3, 1906.

7 SHEETS—SHEET 7.

UNITED STATES PATENT OFFICE.

BERTHOLD SCHNEIDER, OF BERLIN, GERMANY.

ODOMETER FOR USE IN CONNECTION WITH FARE-INDICATORS.

No. 876,100.　　　　Specification of Letters Patent.　　　　Patented Jan. 7, 1908.

Application filed October 3, 1906. Serial No. 337,311.

*To all whom it may concern:*

Be it known that I, BERTHOLD SCHNEIDER, engineer, subject of the German Empire, residing at Berlin, Germany, have invented certain new and useful Improvements in an Odometer for Use in Connection with Fare-Indicators, of which the following is a specification.

This invention relates to an odometer for use in connection with every description of fare-indicator, which is distinguished from devices of a similar character as heretofore constructed inasmuch as it indicates not only the total distance traversed by the vehicle, but also that portion of this distance wherein the vehicle has been occupied by a fare. From the difference between the total distance the vehicle has been driven and that wherein it has been occupied by a fare, the distance it has been driven empty can be ascertained, and the owner of the vehicle is consequently able accordingly to determine through what portion of this distance it has been unoccupied and occupied respectively. For this purpose there is provided in addition to the odometer heretofore usual an auxiliary odometer that is put into and out of engagement according as the fare indicator is in its operative or inoperative position, and that consequently indicates the distance through which the vehicle has been driven while required by a fare.

The accompanying drawings illustrate, by way of example, apparatus in accordance with this invention in connection with a fare-indicator in which the shaft which carries the pointer serves also as the shaft by means of which the mechanism is actuated, so that the setting of the apparatus at "empty", the various fares, "cash" and "occupied" is effected simply by rotating the shaft carrying the pointer. It is however obvious that the apparatus may be connected with any other kind of fare-indicator.

Figure 1:
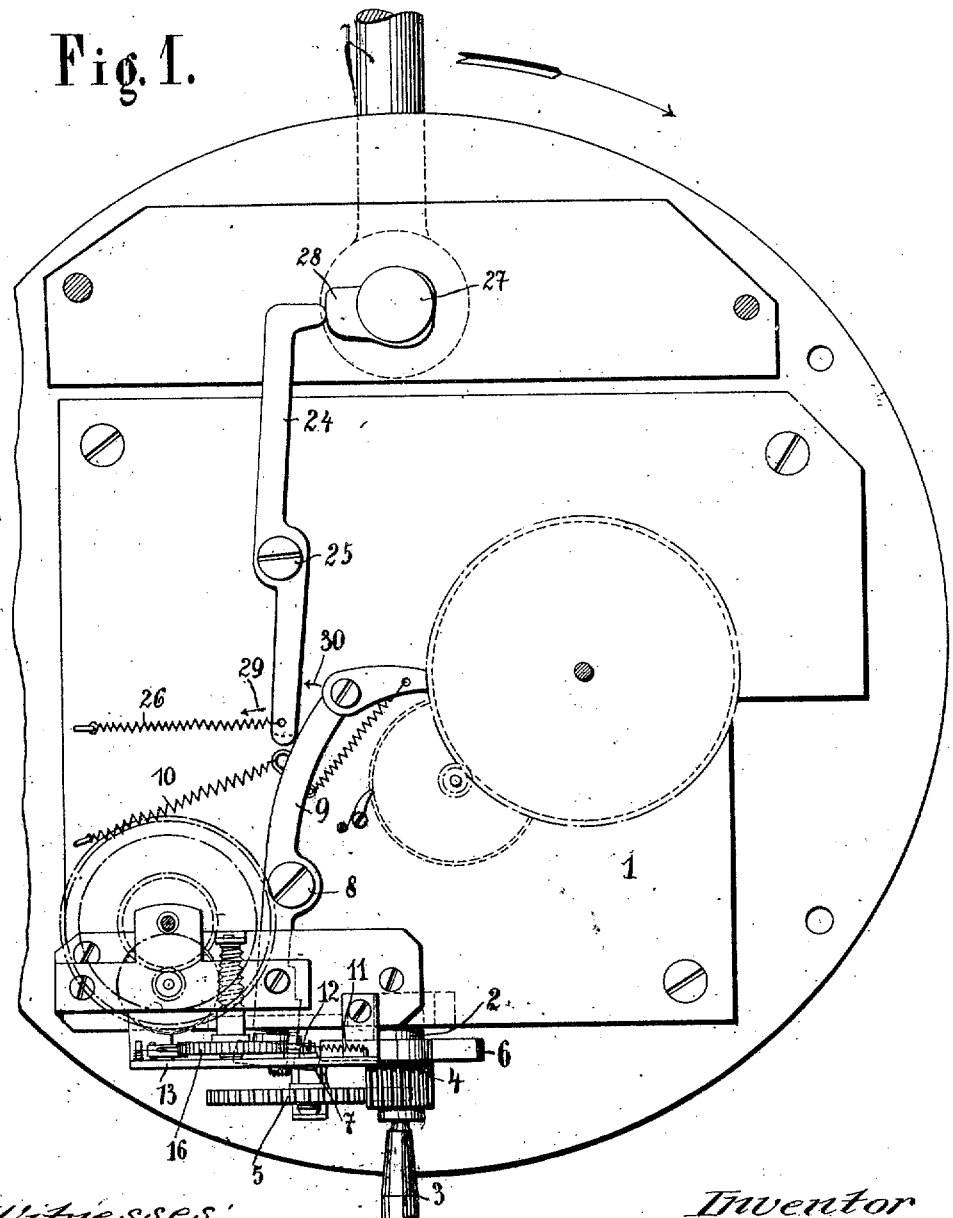
Figure 2:
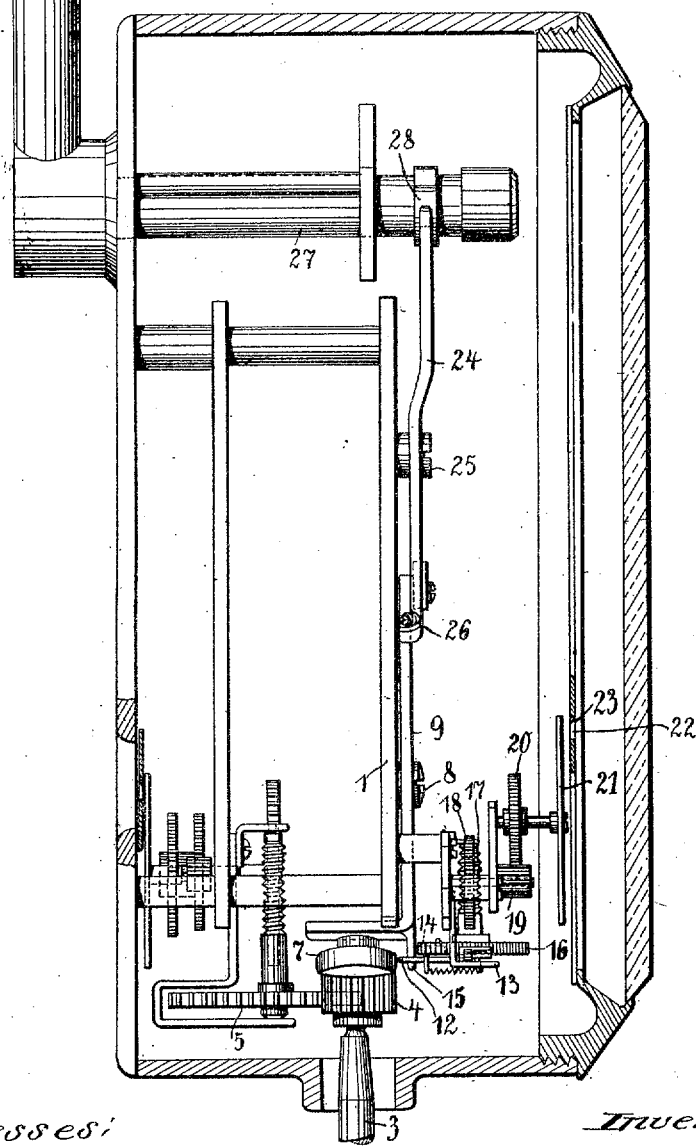
Figure 3:
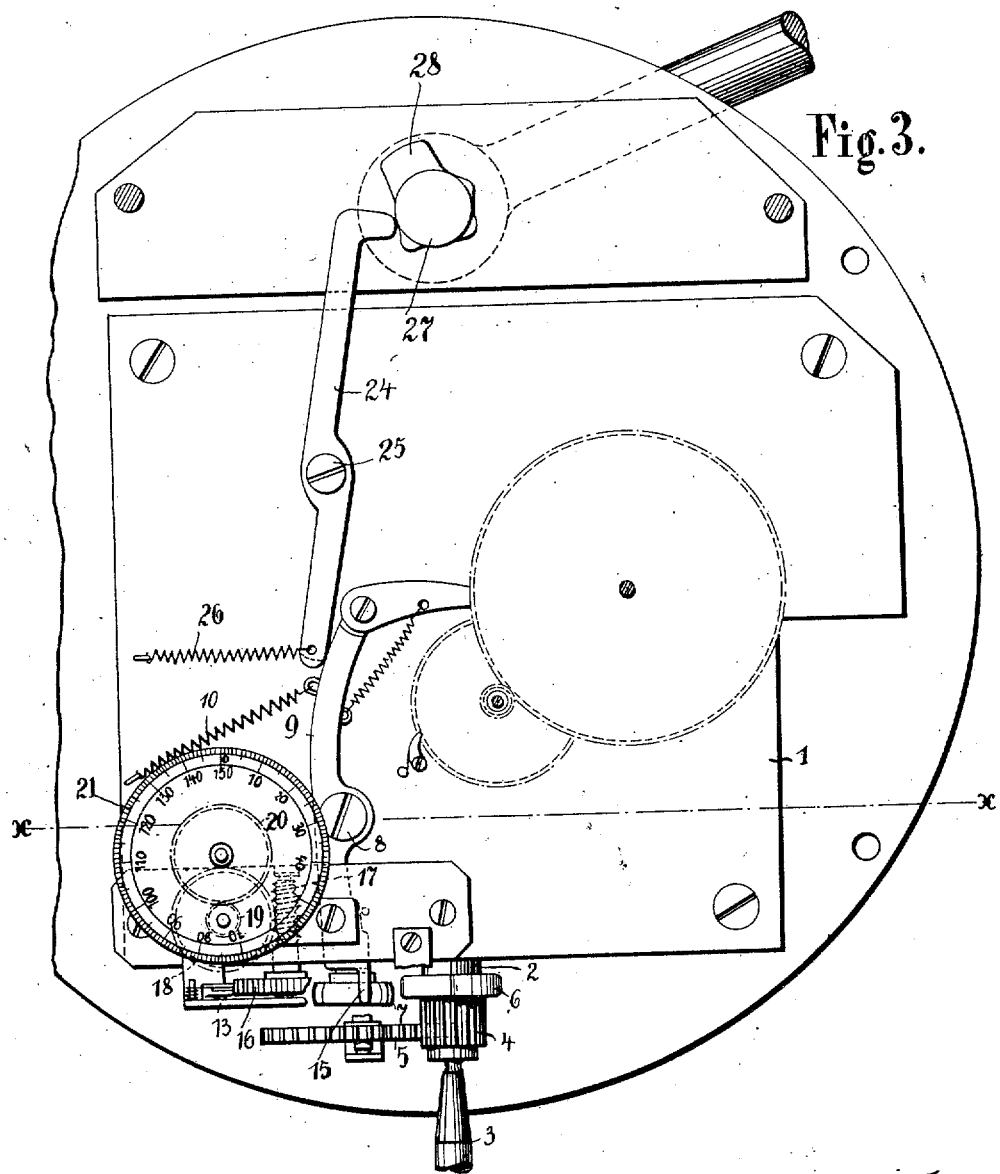
Figure 6:
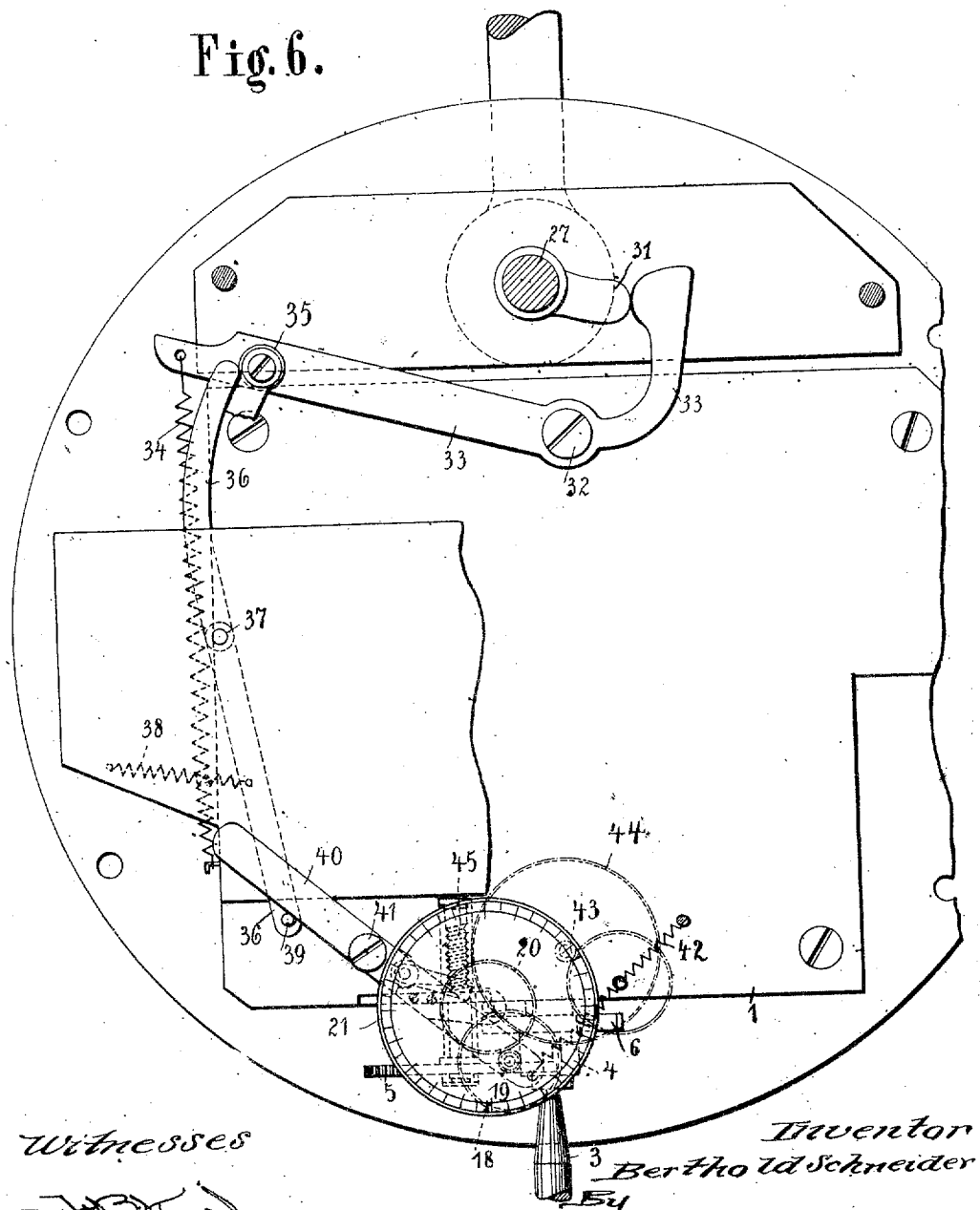
Figure 7:
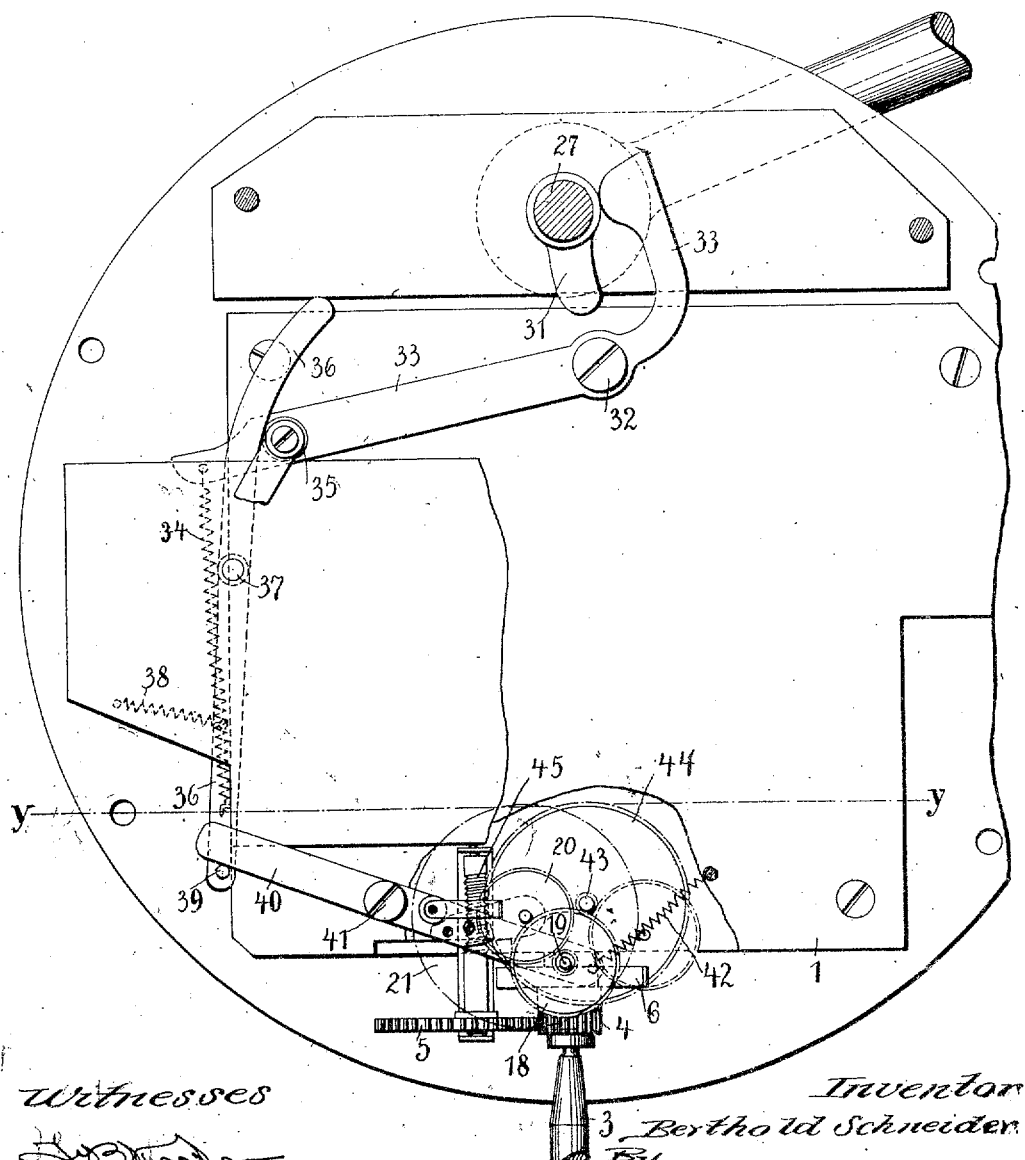
Figure 8:
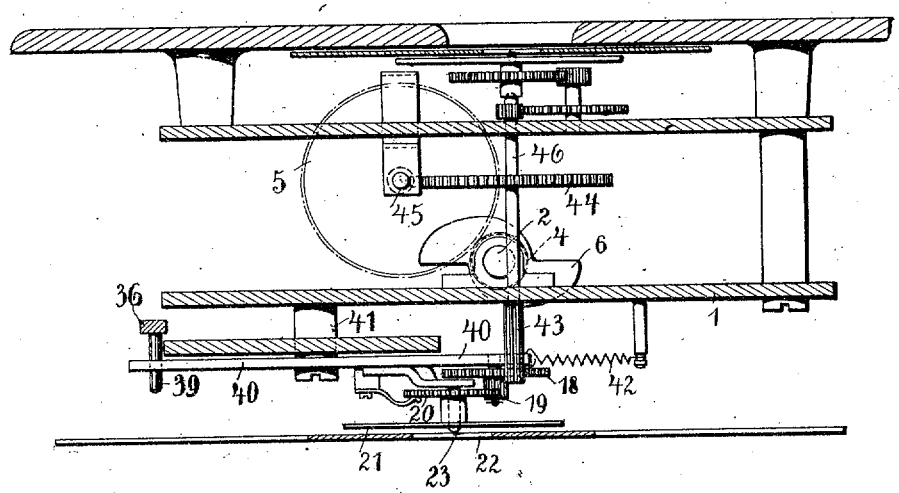

Figure 1 is a front view of the apparatus, the auxiliary odometer being out of engagement; Fig. 2 is a corresponding side view; Fig. 3 is a front view of the apparatus, the fare-indicator being in engagement and the auxiliary odometer consequently in operation; Fig. 4 is a sectional view corresponding to the line $x$—$x$ of Fig. 3; and Fig. 5 shows a portion of Fig. 4 in a different position. Fig. 6–8 show a modified form of arrangement of parts, Fig. 6 being a front view, the auxiliary odometer being out of engagement, Fig. 7 a similar view, the auxiliary being in engagement with the chief odometer, Fig. 8 a vertical section through Fig. 7.

The shaft 2 which is rigidly connected with the flexible shaft 3 actuated from the vehicle wheel, is suitably mounted on the bed plate 1. The pinion 4 is keyed upon the shaft 2 and engages with the spur wheel 5, which actuates the apparatus by means of which the total distance is measured, in such manner as to cause the total distance traversed by the vehicle to be registered by means of the intermittent rotation of the shaft 2 by the flexible shaft 3. Upon the shaft 2 there is likewise rigidly mounted a cam disk 6 of the shape shown in Figs. 4 and 5. The two-armed lever 9 which is mounted to oscillate upon the stud 8 on the bed plate 1, has attached to its lower end a roller 7 and terminates in a finger 15. The two-armed lever 9 is by means of the spring 10 normally maintained in such position as to permit of an oscillatory movement being imparted to it by the action of the cam disk 6 upon the roller 7.

Upon a stout metal angle piece secured upon the bed plate 1, there is mounted to oscillate an arm 12 which by means of a spring 11 is caused to press against the finger 15, and which carries a pawl 14 actuated by a spring 31. This pawl engages with the ratchet wheel 16, and rotates it in the direction of the arrow 32 (Fig. 4). Upon the shaft of the ratchet wheel 16 there is mounted a worm 17 which engages with the worm-wheel 18 and rotates the indicating disk 21 by means of the pinion 19 and spur-wheel 20. The disk 21 moves behind an aperture 22 in the casing of the fare-indicator that is furnished with a pointer 23, by means of which that portion of the distance traversed wherein the vehicle has been occupied by a fare can at once be read off. Upon a stud 25 on the bed-plate 1 there is moreover mounted a two-armed lever 24 the upper end of which by the tension of a spring 26 exerted in the direction of the arrow 27 in Fig. 1 is maintained in contact with the periphery of a cam 28 rigidly keyed upon the shaft 27 that carries the pointer and actuates the mechanism.

The lower end of the lever 24 presses against the upper arm of the lever 9, and under the action of the cam 28 forces this lever towards the right, in the direction opposite to that indicated by the arrow 30 (Fig. 1), the roller 7 being by this means moved out of the path of the cam disk 6.

The apparatus is operated in the following manner:—Assuming that the various portions of the apparatus are in the positions shown in Fig. 1, wherein the hand of the fare-indicator stands at "empty," the cam 28 will then be in contact with the upper part of the two-armed lever 24 and will so oscillate the lever 9 about its stud 8 as to bring the roller 7 out of the path of the cam disk 6. The auxiliary odometer cannot under these circumstances be put into engagement. Should the pointer now be rotated in the direction of the arrow A (Fig. 1) until it assumes the position corresponding to "occupied", the shaft 27 and cam 28 will also be so rotated as to assume the position shown in Fig. 3, wherein the upper end of the lever 24 is no longer in contact with the periphery of the cam. The lever 24 will now under the action of the spring 26 release the lever 9 which thereupon, under the action of the spring 10, is oscillated upon the stud and in the direction of the arrow 30 (Fig. 1), so as to bring the roller 7 upon its lower end within the range of the cam disk 6; which thereupon imparts to the lever 9 a reciprocating or oscillatory movement, and by means of the finger 15 the arm 12, the pawl 14 and the train 16, 17, 18 and 19 causes the auxiliary odometer 21 to be put into operation. When the pointer is again moved back to "empty" by suitably rotating the shaft 27, the pointers shown in Fig. 1 are again resumed, and only the total distance traversed is indicated.

As regards the modified form of construction shown in Figs. 6-8 the auxiliary odometer is arranged on one arm of an oscillating two-armed lever and by means of a suitable lever mechanism is brought into engagement with the chief odometer when the fare-indicator is put in and out of engagement when the said indicator is put out. For this purpose on the flag shaft 27 a cam 31 is fixed which engages a lever 33 oscillating around the pin 32 fastened to the bedplate 1 and which lever 33 stands under the action of a spring 34. Fixed to the said lever 33 is a roller bearing against a two-armed lever 36 when the lever 33 oscillates. This lever 36 which oscillates round its pin 37 is turned back by means of a spring 38. To the other arm of the lever 36 a pin 39 is fastened which bears against the underside of a two-armed lever 40 oscillating at 41 and being influenced by a spring 42. On the other arm of the said lever 40 there are arranged the gear wheels 18, 19, 20 and the indicating disk 21 for the auxiliary odometer. When the lever 40 oscillates the toothed wheel 18 engages a toothed wheel 43 fastened to the shaft 46 for actuating the chief odometer. The said shaft 46 has fixed thereto toothed wheel 44 being in engagement with a worm 45 to the axis of which is fastened a toothed wheel 5 which is rotated from the vehicle wheel in the manner before described. The spring 42 acting on lever 40 tends to turn the latter in such a manner that the wheels 18 & 43 become engaged with each other, whereas the pin 39 acting on the other arm of the lever 40 turns the latter back.

The modified mechanism acts as follows: The shaft 27 being turned and the fare-indicator thereby being put in, the cam 31 is turned from the position shown in Fig. 6 into that shown in Fig. 7. The lever 33 is oscillated by means of the spring 48 and the lever 36 is swung by means of the spring 38. Thereby the pin 39 is moved to the left, so that the spring 42 can draw up the lever 40 carrying the auxiliary odometer bringing the toothed wheel 18 in engagement with toothed wheel 43 of the chief odometer. Therefore during the time the carriage is hired both odometers are in action.

It is obvious that the arrangement may be such that the auxiliary odometer indicates only the distance traversed by the vehicle without a fare that is to say, that it is put into engagement when the fare-indicator is put out of engagement, and vice versa.

Having now particularly described and ascertained the nature of my said invention and in what manner the same is to be performed, I declare that what I claim is:

1. The combination with means for indicating when a vehicle is occupied or unoccupied, of means coöperating therewith and released thereby for indicating the distance traversed by the vehicle when occupied, said distance indicating means released when the first mentioned means is shifted to indicate that the vehicle is occupied, means operated from a moving part of the vehicle for indicating the distance traversed by the vehicle when the vehicle is occupied and unoccupied, and an operative connection between the last-mentioned means and the means for indicating the distance traversed by the vehicle when occupied for operating said last-mentioned means when released by the means for indicating whether the vehicle is occupied or unoccupied.

2. The combination with a means for indicating when a vehicle is occupied or unoccupied, of a main and a secondary odometer, said main odometer indicating the total distance traversed by the vehicle when it is occupied and unoccupied, means operated from a movable part of the vehicle for operating said main odometer, said secondary odometer indicating the distance traversed by the vehicle when it is occupied and coöperating with said means for indicating when the vehicle is occupied or unoccupied, means for releasing said secondary odometer when the means for indicating whether the vehicle is occupied or unoccupied is shifted to indicate that the vehicle is occupied, means operated from the operating means for the main odometer for operating said secondary odometer when the latter is released.

3. The combination with a means for indicating when a vehicle is occupied or unoccupied, of a main odometer for indicating the total distance traversed by the vehicle when occupied and unoccupied, an auxiliary odometer for indicating the distance traversed by the vehicle when occupied, means for operating said main odometer, means connected with the means for indicating when the vehicle is occupied or unoccupied for releasing said auxiliary odometer when said means is shifted to indicate that the vehicle is occupied, and means operated from the operating means for the main odometer for throwing into operation the auxiliary odometer when the latter is released.

4. The combination with means for indicating when a vehicle is occupied or unoccupied, of a main odometer for indicating the total distance traversed when the vehicle is occupied and unoccupied, an auxiliary odometer, a rotatable shaft operatively connected with said main odometer for operating it, a cam disk mounted on said shaft, a spring-controlled oscillatory lever adapted to be periodically engaged by said disk, means operated by the means for indicating whether the vehicle is occupied or unoccupied for releasing said auxiliary odometer when the vehicle is occupied, and means actuated by said lever for operating said auxiliary odometer to thereby indicate the distance traversed by the vehicle when occupied.

5. The combination with a means for indicating when a vehicle is occupied or unoccupied, of a main odometer for indicating the total distance traversed, a normally locked auxiliary odometer, a shaft operatively connected with said main odometer, a cam disk mounted on said shaft, an actuating shaft operated by said means for releasing said auxiliary odometer, a spring-controlled oscillatory lever adapted to be engaged by said actuating shaft and thrown into operative relation with respect to said disk, and means for operating the auxiliary odometer to thereby indicate the distance traversed by the vehicle when the latter is occupied.

In testimony whereof I have hereunto set my hand in presence of two subscribing witnesses.

BERTHOLD SCHNEIDER.

Witnesses:
   WOLDEMAR HAUPT,
   HENRY HASPER.